United States Patent [19]

Harms

[11] Patent Number: 5,259,429
[45] Date of Patent: Nov. 9, 1993

[54] PNEUMATIC TIRE FOR OFFROAD VEHICLES

[76] Inventor: Mark J. Harms, P.O. Box 93, Valley Center, Calif. 92082

[21] Appl. No.: 848,498

[22] Filed: Mar. 9, 1992

[51] Int. Cl.$^5$ .................................. B60C 11/03
[52] U.S. Cl. ........................... 152/209 B; 152/209 R
[58] Field of Search .......... 152/209 R, 209 B, 209 D; D12/145–151

[56] References Cited

U.S. PATENT DOCUMENTS

| | | | |
|---|---|---|---|
| D. 256,008 | 7/1980 | Menin | D12/147 |
| D. 308,038 | 5/1990 | Guidry. | |
| D. 317,187 | 5/1991 | Suzuki | D12/147 |
| D. 323,135 | 1/1992 | Thomas | D12/151 |
| 4,383,567 | 5/1983 | Crum et al. | |
| 4,480,672 | 11/1984 | Marshall et al. | |
| 4,534,392 | 8/1985 | Bonko et al. | 152/209 B |
| 4,791,971 | 12/1988 | Shinn. | |
| 4,982,773 | 1/1991 | Bonko. | |

FOREIGN PATENT DOCUMENTS

| | | | |
|---|---|---|---|
| 1908257 | 9/1969 | Fed. Rep. of Germany | 152/209 B |
| 0143108 | 7/1985 | Japan | 152/209 R |

OTHER PUBLICATIONS

Dick Cepek Off Road Catalog, 1987, pp. 41–44.

Onza Porcupine, "Mountain Bike Action"; p. 68 Jan. 1990.

*Primary Examiner*—Michael W. Ball
*Assistant Examiner*—Nancy T. Krawczyk
*Attorney, Agent, or Firm*—Kerkam, Stowell, Kondracki & Clarke

[57] ABSTRACT

An all terrain vehicle tire has an improved tread including primary lugs arranged in sets equally spaced around the periphery of the tire on each side of the tire centerline with each set including a long lug, at least one intermediate lug and a short lug, with the sets on opposite sides of the centerline being offset substantially one half the pitch of the lug sets, with at least the long and intermediate length lugs each including an elongated central body portion extending at a first acute angle with respect to the centerplane and each of the primary lugs including an inner end directed at a second smaller acute angle relative to the centerplane and an outer end extending over and onto the shoulder of the tire at an obtuse angle with respect to the centerplane. A plurality of secondary lugs in the form of tapered knobs may be located between each of the primary lugs of each set with at least one secondary lug being located on the normal road engaging portion of the tire and at least one secondary lug located on the shoulder portion of the tire.

31 Claims, 6 Drawing Sheets

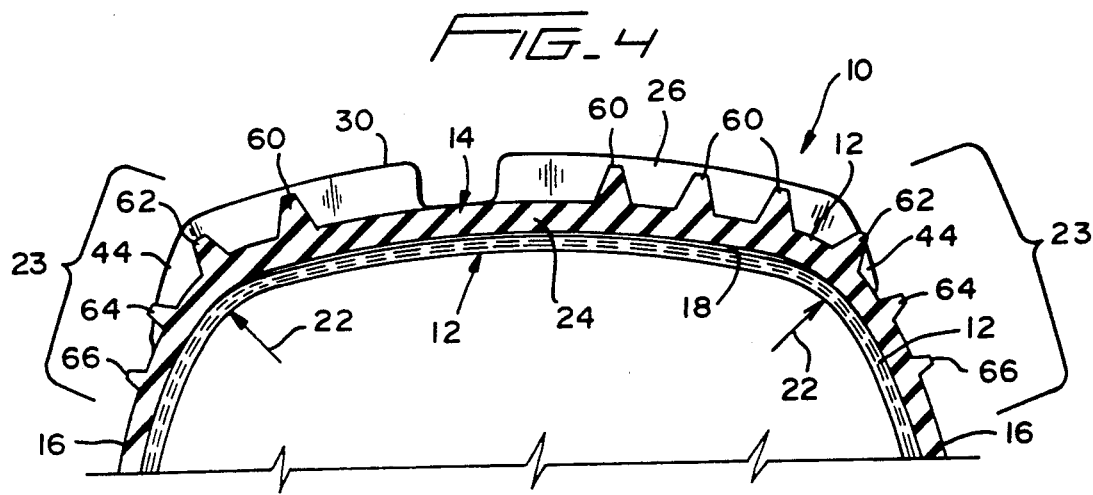
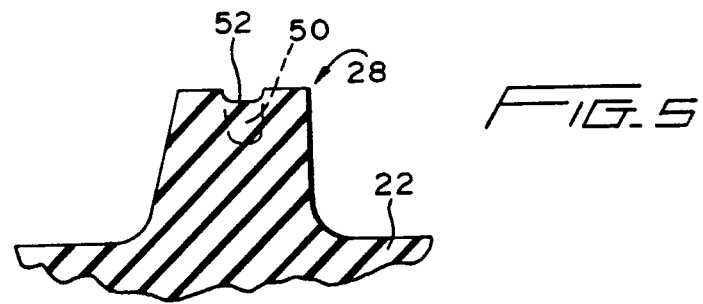
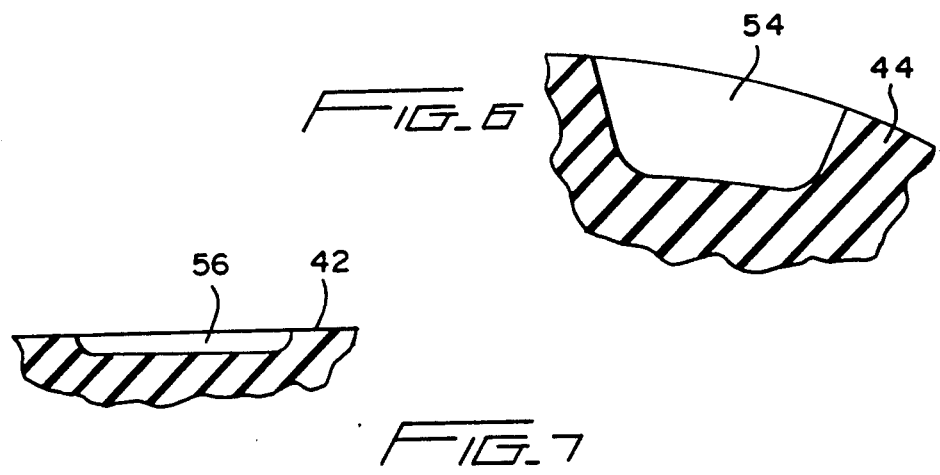

PNEUMATIC TIRE FOR OFFROAD VEHICLES

BACKGROUND OF THE INVENTION

1. Field of the Invention

This invention relates to pneumatic tires for use on offroad vehicles, and more particularly to improved pneumatic tires especially suitable for use on all terrain-type vehicles.

2. Description of the Prior Art

Pneumatic tires designed primarily for offroad vehicles are well known and normally incorporate a tread designed to provide high traction in soft ground such as normally encountered by farm tractors, graders and other heavy equipment. Such tread designs conventionally employ a system of elongated lugs emanating from each lateral edge of the tread and extending to a position near the vertical centerplane of the tire, with the lugs emanating from opposite sides of the tire cooperating to form a generally herringbone pattern. To provide the necessary traction for operating heavy equipment and pulling heavy loads, the lugs are relatively deep and designed to bite into the ground surface. The generally herringbone arrangement of the lugs tends to expel the earth laterally of the tire to facilitate the biting action and prevent the lugs from filling with earth and losing traction. Examples of such known tread designs may be found in U.S. Pat. Nos. 4,791,971; 4,534,392; 4,480,622; and 4,383,567.

While all terrain vehicles (ATVs) are normally operated off the road, their relatively low weight and center of gravity, as well as their speed of operation and maneuverability make the known tractor tire tread designs such as those disclosed in the above U.S. patents generally unsatisfactory for use on such vehicles. Although effective straightline or drawbar traction is required to enable an ATV to traverse rough and hilly terrain as well as mud, sand and snow, substantial lateral traction is also required to enable maneuverability of the vehicle. Further, minimum power or pulling traction is normally employed during maneuvering when maximum lateral traction is required for vehicle stability. Thus, conventional off road tractor tire tread designs are particularly ineffective in providing lateral stability during low wheel torque. It is, therefore, an object of the present invention to provide an improved pneumatic tire for use on off-the-road vehicles.

Another object is to provide an improved pneumatic tire which provides improved traction characteristics for enhanced pulling and maneuvering of off-the-road vehicles.

Another object is to provide a pneumatic tire particularly useful for ATVs and having an improved tread design which provides both improved draw bar traction and lateral stabilization or traction during maneuvering.

SUMMARY OF THE INVENTION

In the attainment of the foregoing and other objects and advantages, an important feature of the invention resides in providing a conventional ATV tire carcass with an improved tread including a plurality of sets of elongated primary lugs extending from a location overlapping the shoulder portion of the carcass sidewall inwardly toward the vertical centerplane of the tire from each side of the tire. Each set of elongated lugs includes a long lug which extends at least substantially to and preferably in overlapping relation with the tire centerplane, at least one intermediate lug extending inwardly a shorter distance toward the vertical centerplane and terminating at a position which does not cross the centerplane, and a short lug which extends inwardly and terminates at a position spaced further from the vertical centerplane than the intermediate length lug.

Each elongated lug includes a lateral stabilizing portion extending in overlapping relation to the shoulder portion of the sidewall of the tire and at an angle relative to the body of the lug which tends to retard the flow of mud, sand, snow or the like laterally of the tire. The sets of lugs on opposite sides of the tire are in offset relation circumferentially relative to one another a distance approximately equal to one half the pitch of the primary lug sets around the tire circumference.

The tread further includes a plurality of secondary lugs which may be generally frustoconical or pyramid-shaped projections located between each adjacent pair of elongated lugs on each side of the tire, including a plurality of such pyramid-shaped lugs integrally molded on and projecting outwardly from the shoulder portion of each sidewall of the tire between the lateral stabilizing portion of each adjacent pair of elongated lugs. Such projections penetrate and provide resistance to the flow of soil laterally between adjacent elongated lugs, with the projections located on the shoulder providing increased lateral stability during sharp maneuvering due to the low inflation pressure used and the resulting tendency of the tires to roll to engage more of the sidewall with the supporting ground surface. During such maneuvering, the angle of the lateral stabilizing portion of the elongated lugs is such as to present substantial resistance to the flow of soil between the lugs or, conversely, to present resistance to the tire moving laterally or sliding sideways through the soil.

In one embodiment of the invention, the elongated lugs of each set are of unequal spacing around the tire periphery, with the inner ends of the short lugs on one side of the tire and the inner ends of the long lugs on the opposite side of the tire being located at substantially the same circumferential positions and in lateral spaced relation to one another, and with the intermediate length lugs on opposite sides of the tire having their inner ends terminating substantially opposite to and spaced from one another.

In an alternate embodiment of the invention, the sets of primary lugs on each side of the tire comprise three lugs including one long lug, one intermediate lug and one short lug equally spaced circumferentially from one another, with a plurality of secondary lugs being located between adjacent elongated lugs of each set both in the tread portion and on the shoulder portion of the tire. If desired, selected ones of the secondary lugs may be in the form of raised lettering.

BRIEF DESCRIPTION OF THE DRAWINGS

Other features and advantages of the invention will be apparent from the detailed description contained hereinbelow, taken in conjunction with the drawings, in which:

FIG. 4 is a fragmentary sectional view taken along line 4—4 of FIG. 3;

FIG. 5 is an enlarged fragmentary sectional view taken along line 5—5 of FIG. 3;

FIG. 6 is an enlarged fragmentary sectional view taken along line 6—6 of FIG. 3;

FIG. 7 is an enlarged fragmentary sectional view taken along line 7—7 of FIG. 3;

DESCRIPTION OF THE PREFERRED EMBODIMENT

Figure 1:
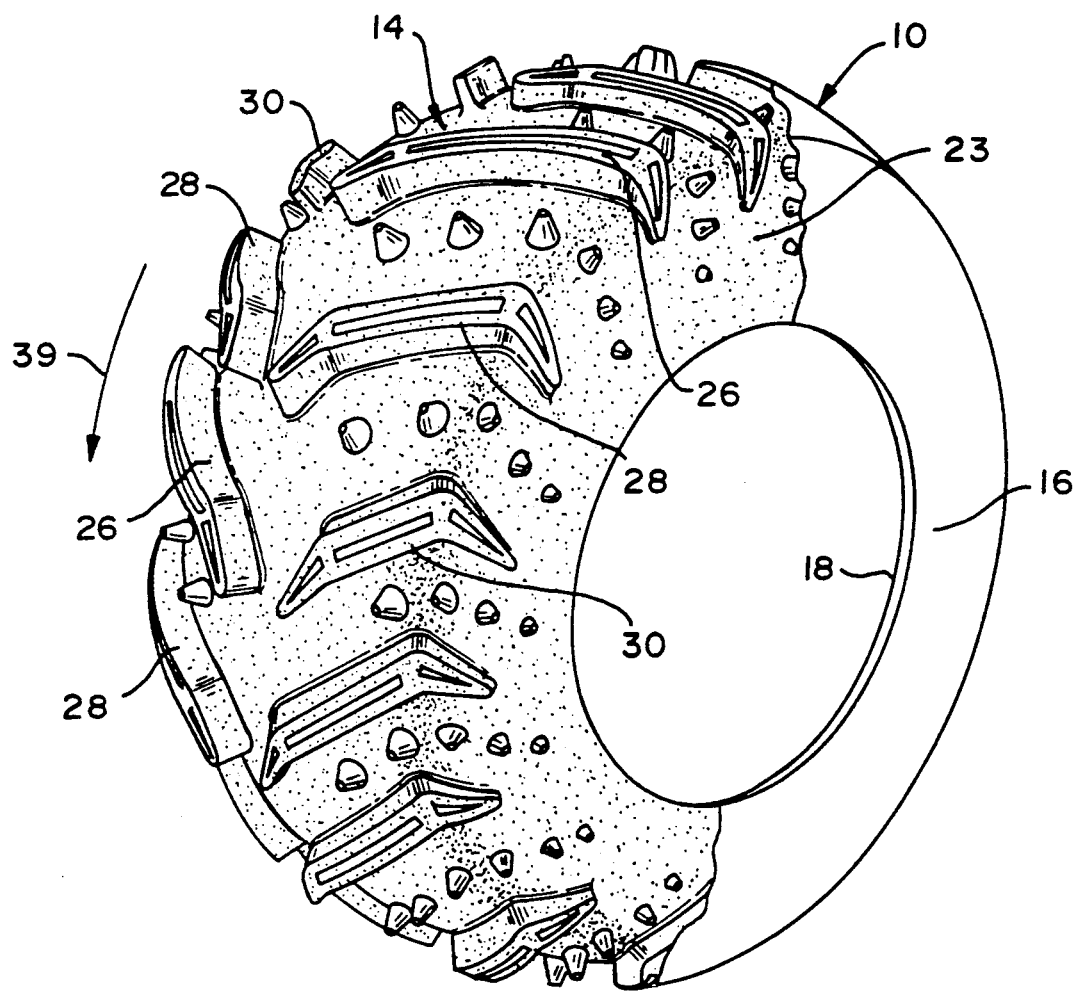
FIG. 1 is an isometric view of an ATV tire embodying the improved tire tread of this invention, it being understood that the tread pattern is repeated throughout the circumference of the tire as shown schematically by solid lines.
Figure 2:
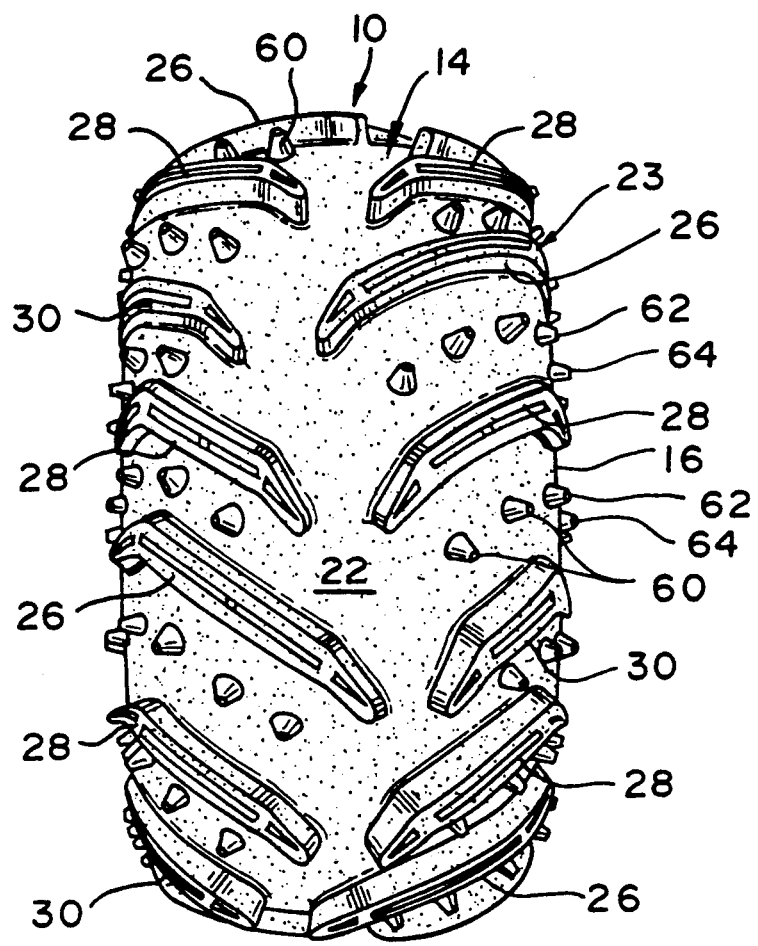
FIG. 2 is a front elevation view of a tire according to the invention.

Referring now to the drawings in detail, a tire intended for use on an all terrain vehicle and embodying the present invention is designated generally by the reference numeral 10 and comprises a reinforced carcass 12 having a road engaging or tread portion 14 and generally radially inwardly extending sidewall portions 16 each terminating in a reinforced bead 18. Carcass 12 may also include a conventional circumferentially extending reinforcing belt 20 as shown in FIG. 4. Tread portion 14 and sidewall portions 16 are joined at transition areas indicated generally in FIG. 4 by the arrows 22, with the portion of the sidewalls adjacent to the transition areas, and indicated in FIG. 4 at 23, being referred to herein as the shoulder. A coating or layer of elastomeric material 24 extends over and is bonded to the outer surface of carcass 12.

The tire tread is molded with and forms an integral part of the coating 24, and in the embodiment shown in FIGS. 1 through 7, the tread comprises a plurality of elongated lugs including long lugs 26, intermediate lugs 28, and short lugs 30, and a plurality of outwardly extending, tapered lugs 32, 34, 36 and 38 preferably in the general shape of a frustum of a pyramid or cone. The lugs 26, 28 and 30 are arranged in sets around the tire tread, on each side thereof, with each set consisting, in sequence, of a long lug 26, an intermediate lug 28, a short lug 30, and a second intermediate lug 28. Lugs 26, 28 and 30 are of similar configuration except for their length, and extend generally parallel to one another as explained more fully hereinbelow.

The elongated tread lugs 26, 28 and 30 extend inwardly from the transition area or edge of the road engaging or tread portion 14 at each side of the tire. For purposes of this description, the transition line may be considered the intersection of the lateral edge of the tread portion 14 and the radially outer portion of the sidewall 16, as defined by a plane perpendicular to the tire axis, it being understood that such intersection is actually a smooth curved transition between the tread and the shoulder portion of the sidewalls. All elongated lugs extend inwardly from the transition area and are inclined in the direction of intended rotation of the tire toward the centerline of the tire, i.e., the line defined by the intersection of a plane perpendicular to the axis and located midway between the shoulders. The direction of intended rotation for forward movement of the ATV is indicated in FIG. 1 by the arrow 39.

Figure 3:
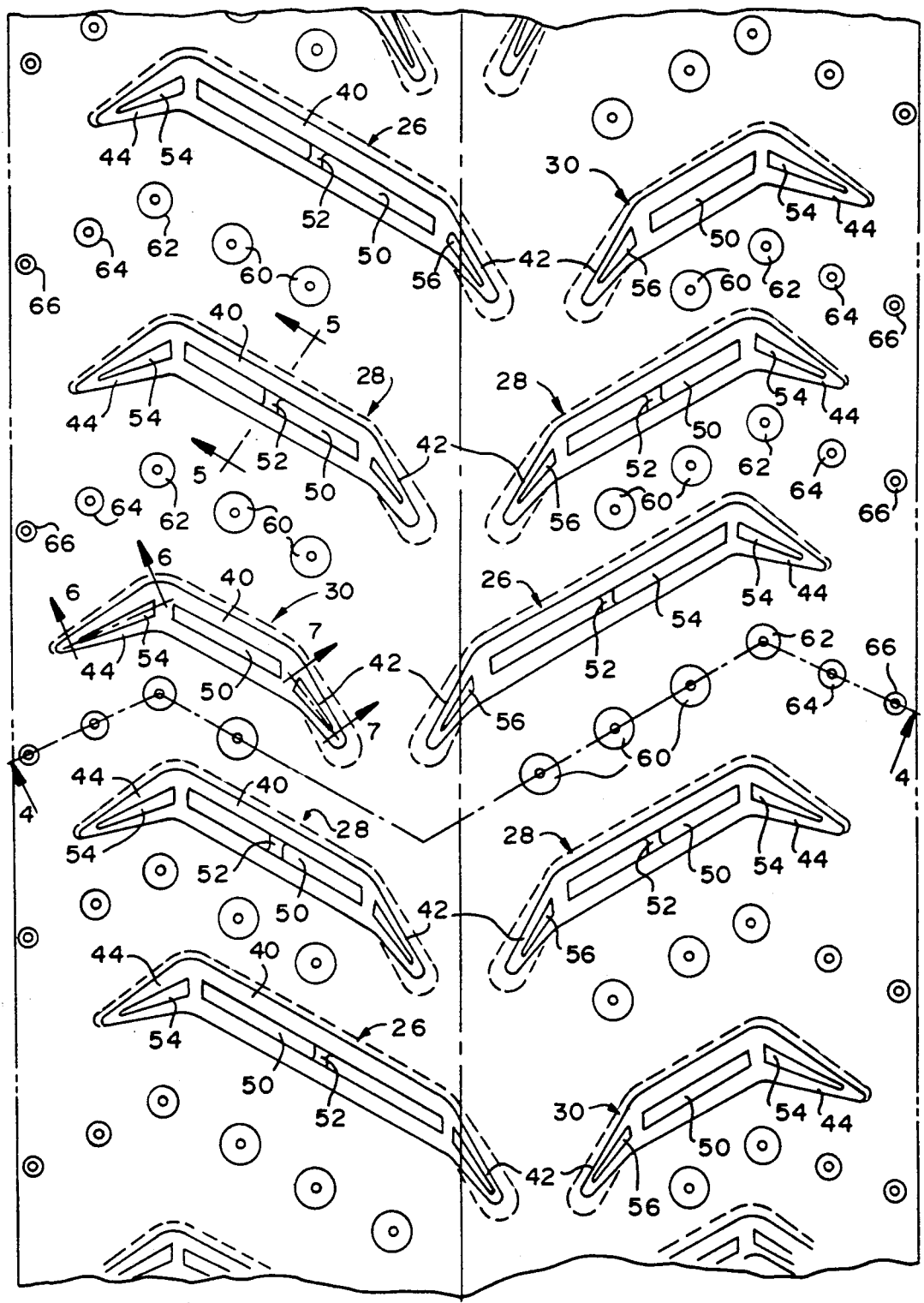
FIG. 3 is a simplified plan view of the tire tread showing the shoulder portion of the tire generated into the plane of the tread.

As most clearly illustrated in FIG. 3, each of the elongated lugs 26, 28 and 30 comprise an elongated, substantially straight body portion 40 extending from the vicinity of the transition line inward, an inner end portion 42 and an outer end portion 44.

The outer end portions 44 extend downwardly, or inwardly along the shoulder portion 23 of sidewalls 16 and are inclined in a forward direction, again with reference to the direction of rotation of the tire during forward movement. The inner end portions 42 are also inclined, with respect to the body portion 40, in a forward direction. As can perhaps best be visualized from FIG. 1, the forwardly extending lug portions 44 provide lateral traction to stabilize a vehicle against skidding, particularly during maneuvering.

ATV tires conventionally are inflated at extremely low pressures to minimize the danger of damage upon engaging stones or other obstacles frequently encountered in the rough terrain in which such vehicles are operated. This low pressure, in combination with the relatively flexible carcass 12 conventionally employed in such tires, results in substantial lateral "rolling" of the tire during severe turning maneuvers. In a sharp turn, the tire will tend to roll or flex axially relative to the wheel rim in a direction to engage more of the tire sidewall on the outside of the turn with the supporting ground surface. During such maneuvers, the body portion 40 of the elongated lugs offer relatively low resistance to lateral skidding since they extend generally parallel to the direction of the resultant force tending to produce such skid movement. However, the forward angle of the segments 44 tend to resist the flow of soil between lugs on the inside of the skid and tend to bite into the soil on the side of the tire in the direction of skid. This antiskid feature is particularly effective where little or no power or even braking, is employed during maneuvering. Segments 44 also provide resistance to the flow of soft soil such as mud or sand, and snow laterally between the elongated lugs to thereby improve traction during straight driving movement. The antiskid feature is enhanced by the secondary lugs as described hereinbelow.

Still referring to FIG. 3, it is seen that the sets of elongated lugs which extend inwardly from opposite shoulders of the tire are offset circumferentially by approximately one half the circumferential length of each group, i.e., approximately one half the lug pitch, so that each long lug 26 has its inner end terminating at a position directly opposite the inner end of the short lug 28 on the opposite side of the tire. Preferably, the length of the body portion 40 of each long lug 26 is such that the inner end portion 42 extends past the vertical centerplane of the tire. The intermediate lugs 28 are arranged in direct opposition to one another on opposite sides of the tire, and their inner ends terminate in opposed relation at points equally spaced from the centerplane. This arrangement results in unequal spacing of the lugs in each set around the periphery of the tire. For example, in each set of elongated lugs the distance, measured circumferentially in the direction of intended rotation, from the leading edge of the body portion 40 of lug 26 to the corresponding point on lug 28 may be substantially equal to the distance between lug 28 and lug 30, while the distance between the leading edge of that lug 30 and the next lug 28 may be substantially equal to the distance between that lug 28 and the next lug 26, but the first two distances may be substantially fifty percent greater than the latter two distances.

The inner end portions 42 of the respective lugs 26, 28, 30 are inclined at a smaller angle with respect to the tire centerline than the body portions 40, with the axial distance between each opposing pair of end segments 42 being substantially equal transversely of the tire tread. The smaller angle of segments 42 provide a more uniform vibration-free rolling movement on hard surfaces or pavement. The segments 42 are tapered to a more narrow width adjacent their end, thereby providing easier penetration of soft soil or sand upon initial contact as the tire rolls over the ground. The reduced angle of segments 44 also tends to increase lateral skid resistance.

The skid resistant segments 44 located on the tire shoulder also are tapered from a maximum width at their junction with the body portions 40 to their ends, with the height of sections 44 relative to the shoulder also diminishing from the body 40 to their end. The staggered length of the lugs 26, 28 and 30 and the offset relation on opposite sides of the tire provides an undulating open center channel around the tire.

As most clearly seen in FIGS. 3 and 4, the center body segment 40 of the short lugs 30 extends to the edge or shoulder of the tire so that the outer end segment 44 of the short lugs are located entirely on the shoulder portion of the sidewalls. The body segments 40 of the lugs 28 and 30 terminate before reaching the shoulder, with the outer segments 44 of these lugs extending into the tread portion. Since segments 44 of the three elongated lugs are of the same length, they extend to different points along the shoulder.

In the embodiment of FIGS. 1-7, the body segments 40 of each of the elongated lugs 26, 28 and 30 may extend at an acute angle of about 55° to 65° and preferably at about 60° with respect to the vertical centerplane of the tire. The inner segments may extend at an acute angle of about 30° to 40° and preferably about 35° with respect to the centerplane. The obtuse angle between the shoulder segments 44, when generated into the track or tread shown in FIG. 3, and the centerplane may be about 110° to 120°, preferably about 115°. All angles are measured in the same direction from the longitudinal centerline of the respective lug segment to the centerplane on the trailing side of the lugs.

The elongated lugs are provided with a trough-shaped channel formed in each of the three sections thereof to thereby present two "leading edges" for increased gripping traction. As shown in FIG. 3, each of the elongated body portions 40 are provided with an elongated channel-shaped relief trough 50, and a stiffening bridge 52 is provided at substantially the midpoint of channels 50 for the long and intermediate length lugs. The depth of the relief channel and the stiffening bridge are illustrated in the sectional view of FIG. 5. Each of the outer end segments 44 are also provided with an elongated relatively deep relief trough 54 and the inner end segments 42 are provided with a more shallow relief trough 56 as shown in FIGS. 6 and 7, respectively. Channels of this general type are known in the art as shown, for example, in U.S. Design Pat. No. 308,038.

As shown in FIG. 5, the leading edge of the elongated body portion of each of the respective lugs extends in a plane generally perpendicular to the surface of the tire whereas the trailing edge is inclined at an angle, preferably about 10°, to the surface to provide reinforcement or rigidity to the respective lugs. The generally vertical front face of the lugs provide increased biting action for the lug in soft soil.

In addition to the elongated lugs 26, 26 and 30, the tire is provided with a plurality of secondary lugs in the form of tapered knobs or projections integrally molded with the elastomeric material of the tread at locations between each adjacent pair of the elongated lugs around the periphery of the tire. As shown in the drawings, the tapered lugs preferably are substantially frusto-conical in shape and may be of different sizes depending upon the location on the tire. For example, cone-shaped lugs 60 located generally between the body portion 40 of the elongated lugs may be the largest and preferably have a height substantially equal to or slightly less than the height of the body 40. In the embodiment shown in FIGS. 1-7, three of the cone-shaped lugs 60 are located in a straight line generally parallel to and on the leading side of the lug sections 40 of the long lug 26 while two lugs 60 are similarly located forward of the central body 40 of intermediate length lugs 28 and a single lug 60 is located forward of the body 40 of short lug 30.

An intermediate sized cone-shaped lug 62 is located substantially at the transition line between the shoulder and tread portion of the tire between each adjacent pair of elongated lugs around the periphery of the tire on each side thereof, with the lugs 62 being arranged in line with the lugs 60 as viewed in the plan view, or track, shown in FIG. 3. Additional cone-shaped lugs 64, 66 are integrally molded on and project outwardly from the shoulder of the tire, with lugs 64 being smaller than lugs 62 and lugs 66 being smaller than lugs 64. Lugs 64 and 66 are located between adjacent antiskid segment 44 of adjacent elongated lugs, spaced radially inward along the shoulder and in a line generally parallel with the longitudinal centerline of lug segments 44. The arrangement, size and location of the tapered lugs relative to the elongated lugs and their position on the tread and shoulder portions of the tire is apparent from the isometric showing in FIG. 1.

It should be apparent that the conical lugs 60 and 62, located between adjacent elongated lugs, will provide resistance to the extrusion, or expulsion, of soft earth, sand or snow from between the lugs, and will augment traction in more firm soils or on hard surfaces. The secondary lugs 62, 64 and 66 at and on the tire shoulder portion will provide traction and skid resistance in deep mud or sand during straight movement and will provide substantial resistance to skidding during maneuvering wherein the tire is distorted to bring the shoulder portion of the sidewall into contact with the terrain over which the vehicle is operated. Thus, the secondary lugs located both on the normal tread portion and in the shoulder portion of the tire substantially enhance maneuverability of all terrain vehicles both in very soft mud, snow or sand and in more firm soil conditions.

Figure 8:
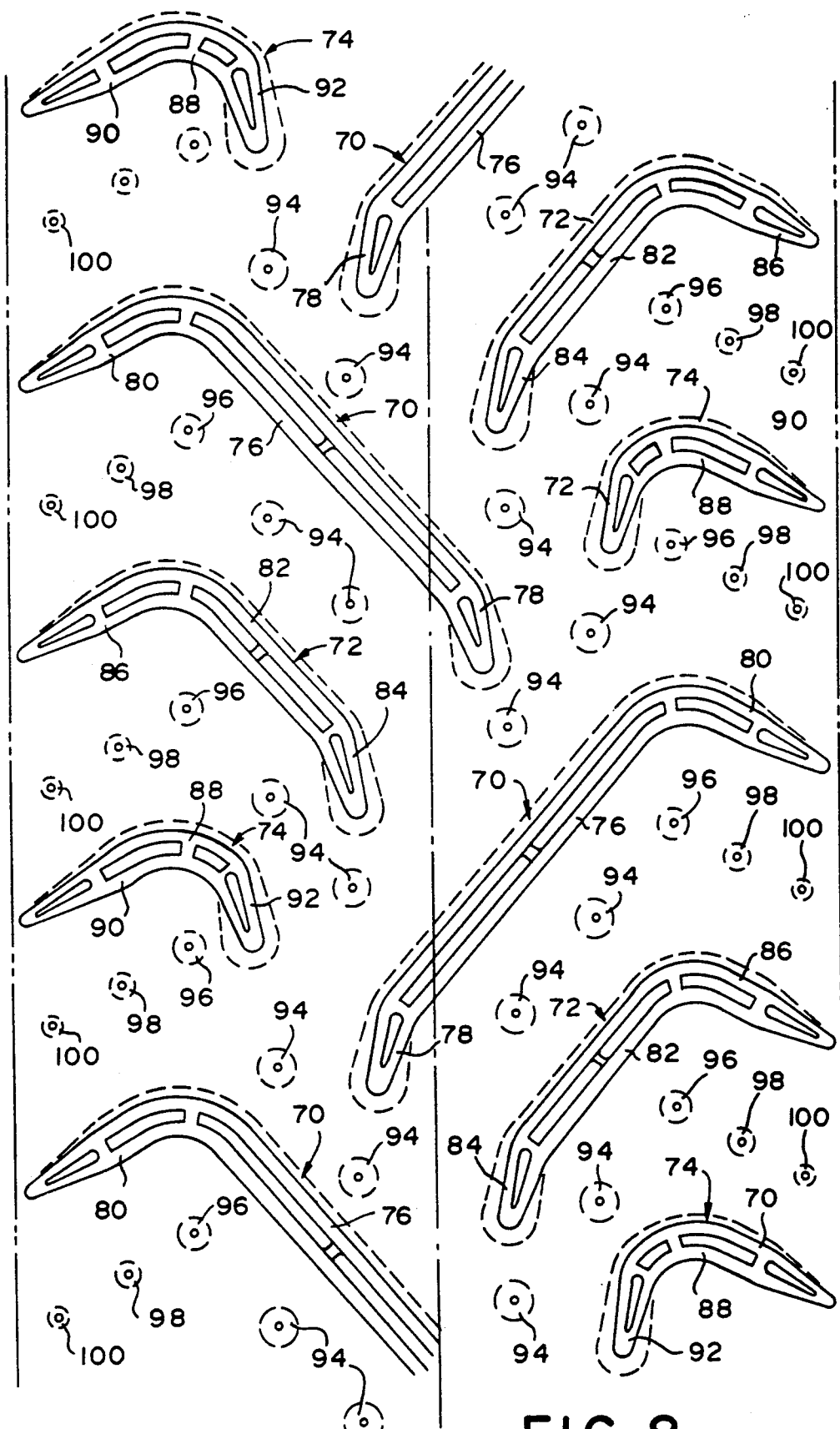
FIG. 8 is a view similar to FIG. 3 showing an alternate embodiment of the invention.
Figure 9:
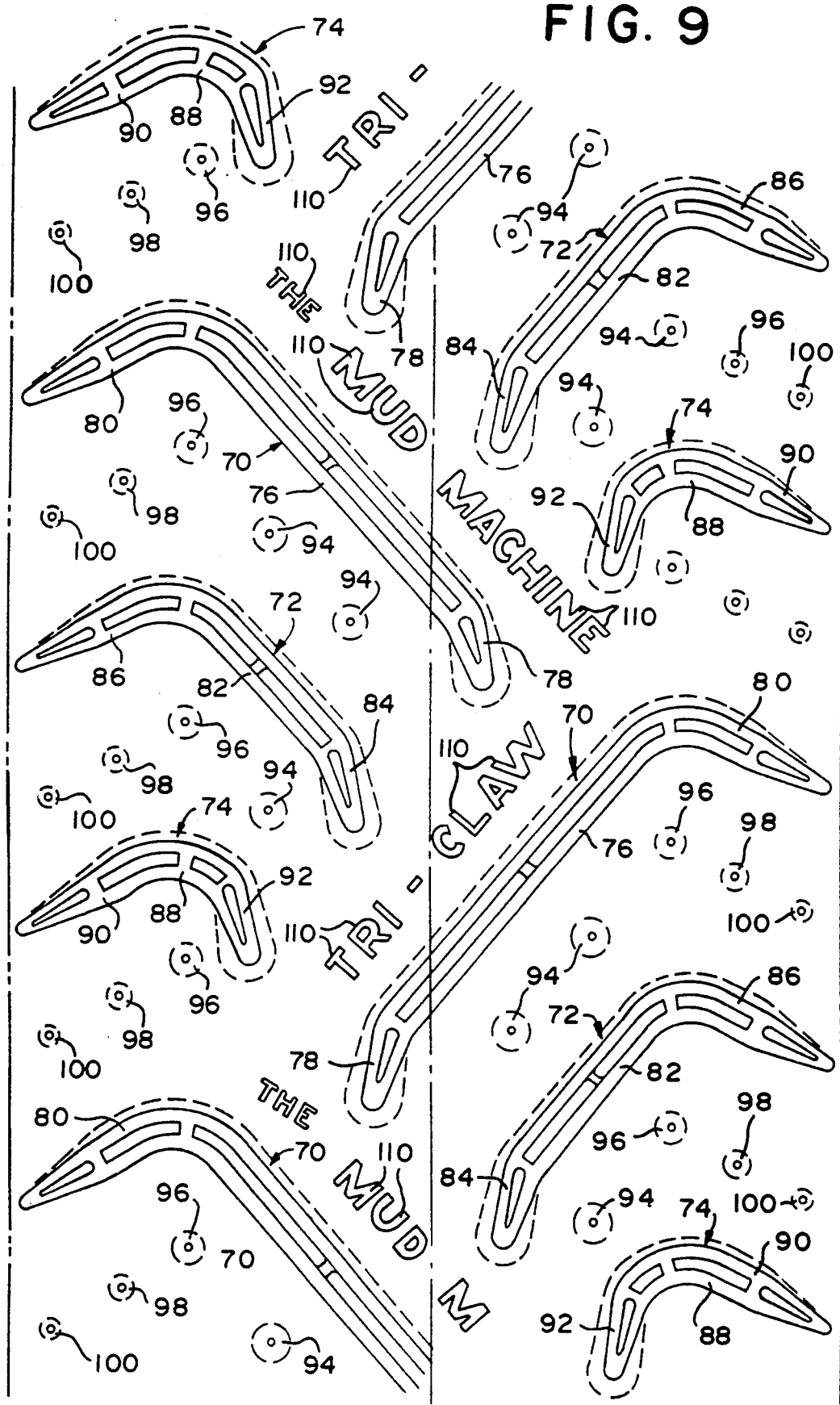
FIG. 9 is a view similar to FIG. 8 and showing a modification thereof.

Alternate tread designs for the improved ATV tire according to the present invention are illustrated in FIGS. 8 and 9. In these embodiments, the primary elongated or main traction lugs are arranged in sets of three around the periphery of the tire on each side thereof, with each set comprising a long lug 70, an intermediate lug 72 and a short, generally crescent shaped lug 74, and with lugs 70, 72 and 74 being equally spaced circumferentially around the tire. Long lug 70 has a generally straight body portion 76 extending from a point substantially at the shoulder to a point extending preferably slightly beyond the vertical centerplane of the tire.

Lug 70 terminates at its inner end in a forwardly inclined, tapered end portion 78 corresponding generally to the inner ends 42 of the previously described embodiment. Lug 70 terminates at its outer end in an antiskid section 80 extending from an area adjacent the outer edge of the tread portion of the tire onto the shoulder portion in the manner similar to lug segment 44 described above. Section 80 may be joined to body section 76 at a generally curved or arcuate juncture as shown in FIG. 8, or, alternatively, may be generally angular as illustrated in FIG. 3.

The medium length lug 72 also comprises an elongated generally straight body section 82 terminating at its inner end in a generally tapered end segment 84 extending generally parallel to inner segment 70 but located between the shoulder and the longitudinal centerline. Lugs 72 also terminate at their outer end in an antiskid segment 86 corresponding to segment 80 along the tire shoulder.

The short lug 76 is generally crescent-shaped and includes a body portion 88 overlying the transition line between the tread and shoulder and an outer antiskid segment 90 corresponding to end portions 80 and 86. Body portion 88 also terminates at its inner end in a forwardly inclined, tapered end portion 92 spaced inwardly of but close to the transition line between the tread and shoulder.

The elongated body portion of lugs 70 and 72 may be inclined with respect to the tire centerplane at an angle of about 35° to 45°, and preferably about 40°, while the longitudinal centerline of tapered lug segments 78, 84 and 90 may be inclined at an angle of about 10° to 20°, and preferably about 15°. The outer end segments 80, 86 and 90, located on the shoulder of the tire, may be inclined at an angle of about 110° to about 130°, and preferably about 120° with respect to the tire centerplane, as viewed in FIG. 8. As described above, lugs 70, 72 and 74 may have relief channels formed into their outer faces.

The embodiment of FIG. 8 also includes a plurality of secondary lugs in the form of tapered, conical or pyramid-like knobs located both on the tread portion and the shoulder portion of the tire between each adjacent pair of elongated lugs of each set. In this embodiment, the secondary lugs are arranged in ten rows circumferentially around the tire, with four rows of large lugs 94 located in the tread portion two on each side of the tire centerline. The rows of secondary lugs 94 on each side of the centerline are spaced about ⅜ and ⅝, respectively, of the distance between the centerline and the transition line. Each row of secondary lugs 94 includes one lug between each adjacent pair of elongated lugs.

A row of secondary lugs 96, which preferably are smaller than lugs 94, is located at the transition line on each side of the tire. The lugs 94 and 96 between each adjacent pair of elongated lugs are arranged in a straight line generally parallel to the body portions 76 and 82.

Two rows of secondary lugs 98, 100, respectively, are also located on the shoulder portion of each sidewall of the tire, with the lugs 98 preferably being smaller than lugs 96 and lugs 100 being smaller than lugs 98. The lugs 98, 100 between each adjacent pair of elongated lugs are spaced from one another along the shoulder, with the lugs 96, 98 and 100 extending in a line generally parallel to the longitudinal centerline of the tapered end portions 80, 86 and 90 of lugs 70, 72 and 74, respectively.

The sets of elongated lugs 70, 72 and 74 on opposite sides of the tire centerline are offset circumferentially by one half the lug pitch, with the lugs on the opposite sides being spaced to provide an open, undulating center channel around the tire. In the embodiment of FIG. 8, this undulating channel extends closer to each edge of the tread portion than in the case of the embodiment described with respect to FIGS. 1 through 7. Also, the angle of the primary or elongated lugs of this alternate embodiment are such as to present greater lateral traction. This angle of the elongated lugs inherently produces a greater tendency to expel or extrude soft soil and mud laterally during normal straight line movement under power; however, this tendency is reduced by the strategically placed secondary lugs between each adjacent pair of elongated lugs. It is noted, also, that in this latter embodiment of the invention, the elongated lugs, and particularly the short crescent-shaped lugs 74, extend further along the shoulder of the tire to provide increased traction during severe maneuvering when the tire tends to roll on the wheel to engage more of the shoulder with the ground.

FIG. 9 represents a modification of the embodiment shown in FIG. 8 wherein selected ones of the tapered knobs 94 are replaced by raised lettering, illustrated in the drawings as comprising lettering to spell the trademarks TRI-CLAW and the MUD MACHINE. In this modification, only half of the secondary lugs 94 located on the tread portion of the tire are employed, leaving an open undulating or zig-zag path around the tire criss-crossing the centerline on the trailing side of the long lugs 70. The omitted secondary lugs are replaced by raised lettering generally following the zig-zag path, with the individual letters forming the secondary lugs in this area to increase the resistance to the flow, or expulsion, of soft earth between adjacent elongated lugs. The individual letters, indicated generally by the reference numeral 110, are raised from the surface of the molded elastomeric body 24 and projects outwardly a distance less than the height of the elongated lugs 70, 72 and 74. Such lettering has a height no greater than, and preferably less than the height of secondary lugs 94.

While the number of raised letters 110 used in the embodiment of FIG. 9 may exceed the number of secondary lugs 94 which the letters replace, it should be apparent that any number of such letters may be employed, and that the size and orientation of the lettering should be such as to perform the function of retarding the flow of soft earth and providing lateral stability in the same manner as the secondary lugs 94 located on the tread portion of the tire shown and described with respect to FIG. 8. Thus, the raised lettering functions as and becomes a part of the secondary lug pattern.

While I have disclosed and described preferred embodiments of my invention, I wish it understood that I do not intend to be limited solely thereto, but rather that I do intend to include all embodiments of the invention which should be apparent to one skilled in the art and which come within the spirit and scope of my invention.

I claim:

1. In a pneumatic tire for an off-the-road vehicle such as an all terrain vehicle or the like having a tread formed from an elastomeric material carried on a reinforced carcass and including an outwardly directed road engaging portion and sidewalls terminating in reinforced beads for mounting on a supporting wheel, the sidewalls including shoulder portions extending from said road engaging portion inwardly toward the beads, the tread extending over the road engaging portion and said shoulder portions completely around said tire, the improvement wherein said tread comprises
    a plurality of primary lugs arranged in sets equally spaced around the periphery of the tire on each side of the circumferential centerplane of the tire, each said set of primary lugs including a long lug, at least one intermediate length lug and a short lug, with the sets of primary lugs on each side of the centerplane being offset circumferentially by a distance substantially equal to one half the circumferential pitch of the lug sets, each said long and said intermediate length lug including a central body portion extending at an acute angle with respect to said centerplane, said primary lugs each including an outer end portion extending onto the adjacent shoulder portion at an obtuse angle relative to said centerplane, and said primary lugs each including an elongated inner end portion extending at an acute angle relative to said centerplane which is less than said acute angle of said body portions.

2. The pneumatic tire defined in claim 1 further comprising a plurality of secondary lugs in the form of tapered knobs including at least one such secondary lug located in the road engaging portion and at least one such secondary knob located in the shoulder portion of the tread between each adjacent pair of lugs around the periphery of the tire on each side of the centerplane.

3. The pneumatic tire defined in claim 2 wherein said tread comprises at least four of said secondary lugs located between each said adjacent pair of primary lugs around the periphery of the tire on each side of said centerplane, and wherein at least two of said at least four secondary lugs are located on the shoulder portion of the tire.

4. The pneumatic tire defined in claim 3 wherein said secondary lugs are substantially frustoconical in shape.

5. In a pneumatic tire for an off-the-road vehicle such as an all terrain vehicle or the like having a tread formed from an elastomeric material carried on a reinforced carcass and including an outwardly directed road engaging portion and sidewalls terminating in reinforced beads for mounting on a supporting wheel, the sidewalls including shoulder portions extending from said road engaging portion inwardly toward the beads, the tread extending over the road engaging portion and said shoulder portions completely around said tire, the improvement wherein said tread comprises a plurality of elongated primary lugs arranged in sets equally spaced around the periphery of the tire on each side of the circumferential centerplane of the tire, each said set of primary lugs including a long lug, at least one intermediate length lug and a short lug, with the sets of primary lugs on each side of the centerplane being offset circumferentially by a distance substantially equal to one half the circumferential pitch of the lug sets, each said primary lug having an elongated central body portion extending at a acute angle with respect to said centerplane, an outer end portion extending onto the adjacent shoulder portion at an obtuse angle relative to said centerplane, and an inner portion extending at an acute angle relative to said centerplane which is less than the acute angle of said body portions, said body portions on each side of said centerplane being substantially parallel to one another.

6. The pneumatic tire defined in claim 5 wherein said body portion of each said primary lug extends at an angle within the range of about 55° to 65° with respect to said centerplane.

7. The pneumatic tire defined in claim 5 wherein said inner end portion of each said primary lug extends at an angle of about 30° to 40° with respect to said centerplane.

8. The pneumatic tire defined in claim 5, wherein said outer end portion of each said primary lug extends at an angle of about 110° to 120° with respect to said centerplane.

9. The pneumatic tire defined in claim 5 further comprising a plurality of secondary lugs in the form of tapered knobs including at least one such secondary lug located in the road engaging portion and at least one such secondary lug located in the shoulder portion of the tread between each adjacent pair of lugs around the periphery of the tire on each side of the centerplane.

10. The pneumatic tire defined in claim 9 wherein said tread comprises at least four of said secondary lugs located between each said adjacent pair of primary lugs around the periphery of the tire on each side of said centerplane, and wherein at least two of said at least four secondary lugs are located on the shoulder portion of the tire.

11. The pneumatic tire defined in claim 10 wherein said secondary lugs are substantially frustoconical in shape.

12. The pneumatic tire defined in claim 10 wherein the body portion of each said primary lug extends at an angle within the rang of about 55° to 65° with respect to said centerplane.

13. The pneumatic tire defined in claim 11 wherein said inner end portion of each primary lug extends at an acute angle of about 30° to 40° with respect to said centerplane and said outer end portion extends at an angle of about 110° to 120° with respect to said centerplane.

14. In a pneumatic tire for an off-the-road vehicle such as an all terrain vehicle or the like having a tread formed from an elastomeric material carried on a reinforced carcass and including an outwardly directed road engaging portion and sidewalls terminating in reinforced beads for mounting on a supporting wheel, the sidewalls including shoulder portions extending from said road engaging portion inwardly toward the beads, the tread extending over the road engaging portion and said shoulder portions completely around said tire, the improvement wherein said tread comprises a plurality of elongated primary lugs arranged in sets equally spaced around the periphery of the tire on each side of the circumferential centerplane of the tire, each said set of primary lugs including a long lug, at least one intermediate length lug and a short lug, with the sets of primary lugs on each side of the centerplane being offset circumferentially by a distance substantially equal to one half the circumferential pitch of the lug sets, and the spacing of said primary lugs around the periphery of the tire being such that each lug of each set of primary lugs on one side of the centerplane terminates at its inner end at substantially the same position circumferentially of the tire as a primary lug on the other side of the centerplane.

15. The pneumatic tire defined in claim 14 wherein each set of primary lugs includes, in sequence around the tire, a long lug, an intermediate length lug, a short lug, and a second intermediate length lug, and wherein the circumferential distance between adjacent lugs in each set are not all equal.

16. The pneumatic tire defined in claim 15 further comprising a plurality of secondary lugs in the form of tapered knobs including at least one such secondary lug located in the road engaging portion and at least one such secondary knob located in the shoulder portion of the tread between each adjacent pair of lugs around the periphery of the tire on each side of the centerplane.

17. The pneumatic tire defined in claim 16 wherein said tread comprises at least four of said secondary lugs located between each said adjacent pair of primary lugs around the periphery of the tire on each side of said centerplane, and wherein at least two of said at least four secondary lugs are located on the shoulder portion.

18. The pneumatic tire defined in claim 17 wherein said body portion of each said primary lug extends at an angle within the range of about 55° to 65° with respect to said centerplane.

19. The pneumatic tire defined in claim 18 wherein said inner end portion of each said primary lug extends at an angle of about 30° to 40° with respect to said centerplane.

20. The pneumatic tire defined in claim 19 wherein said outer end portion of each said primary lug extends at an angle of about 110° to 120° with respect to said centerplane.

21. In a pneumatic tire for an off-the-road vehicle such as an all terrain vehicle or the like having a tread formed from an elastomeric material carried on a reinforced carcass and including an outwardly directed road engaging portion and sidewalls each terminating in a reinforced bead for mounting on a supporting wheel, the sidewalls including shoulder portions extending from said road engaging portion inwardly toward the bead, the tread extending over the road engaging portion and said shoulder portions completely around said tire, the improvement wherein said tread comprises a plurality of primary lugs arranged in sets equally spaced around the periphery of the tire on each side of the circumferential centerplane of the tire, each said set of primary lugs consisting of a long lug, an intermediate length lug and a short lug, with the sets of primary lugs on each side of the centerplane being offset circumferentially by a distance substantially equal to one half the circumferential pitch of the lug sets, each said long and said intermediate length lug including an elongated, substantially straight central body portion extending inwardly from a point adjacent said shoulder at an acute angle with respect to said centerplane and each said short lug including a curved body portion overlying and extending into adjacent edge portions of said road engaging portion and one of said shoulders, said primary lugs each including an outer end portion extending onto said shoulder at an obtuse angle relative to said centerplane, and an inner end portion extending at an acute angle relative to said centerplane which is less than the acute angle of said body portions.

22. The pneumatic tire defined in claim 2 wherein each said straight body portion extends at an angle within the range of about 35° to 45° with respect to said centerplane.

23. The pneumatic tire defined in claim 3 wherein said inner end portion of each said primary lug extends at an angle of about 10° to 20° with respect to said centerplane.

24. The pneumatic tire defined in claim 3 wherein said outer end portion of each said primary lug extends at an angle of about 110' to 130° with respect to said centerplane.

25. The pneumatic tire defined in claim 21 further comprising a plurality of secondary lugs in the form of tapered knobs including at least one such tapered knob located on the road engaging portion between at least selected adjacent pairs of said primary lugs and at least one such tapered knob located in the shoulder portion of the tread between each adjacent pair of primary lugs around the periphery of the tire on each side of the centerplane.

26. The pneumatic tire defined in claim 25 wherein said tread comprises at least four of said tapered knobs located between each said adjacent pair of primary lugs around the periphery of the tire on each side of said centerplane, and wherein at least two of said at least four tapered knobs are located on the shoulder portion of the tire.

27. The pneumatic tire defined in claim 26 wherein said tapered knobs are substantially frustoconical in shape.

28. The pneumatic tire defined in claim 26 wherein each said substantially straight body portion extends at an angle of about 35° to 45' with respect to said centerplane.

29. The pneumatic tire defined in claim 28 wherein said inner end portion of each primary lug extends at an acute angle of about 10° to 20° with respect to said centerplane and said outer end portion extends at an angle of about 110° to 130° with respect to said centerplane.

30. The pneumatic tire defined in claim 29 wherein the spacing of said primary lugs around the periphery of the tire is substantially equal.

31. The pneumatic tire defined in claim 2 further comprising a plurality of secondary lugs in the form of raised lettering located on said road engaging portion, said raised lettering having a radial height less than that of said primary lugs.

* * * * *

UNITED STATES PATENT AND TRADEMARK OFFICE
CERTIFICATE OF CORRECTION

PATENT NO. : 5,259,429
DATED : November 9, 1993
INVENTOR(S) : Mark J. HARMS It is certified that error appears in the above-identified patent and that said Letters Patent is hereby corrected as shown below:

Col. 12, line 47, (Claim 31, line 1), "claim 2" should be -- claim 25 --.

Signed and Sealed this

Seventh Day of June, 1994

*Attest:*

BRUCE LEHMAN

*Attesting Officer*  *Commissioner of Patents and Trademarks*